United States Patent [19]

Tsunoda

[11] Patent Number: 4,678,336
[45] Date of Patent: Jul. 7, 1987

[54] APPARATUS FOR DETECTING IMAGE AREA OF THIN PLATE

[75] Inventor: Teruo Tsunoda, Chiba, Japan

[73] Assignee: Komori Printing Machinery Co., Ltd., Tokyo, Japan

[21] Appl. No.: 656,158

[22] Filed: Sep. 28, 1984

[51] Int. Cl.⁴ ............................................. G01B 11/28
[52] U.S. Cl. .................................. 356/380; 336/379; 362/11
[58] Field of Search .................. 356/379, 380; 362/11, 362/16, 18

[56] References Cited

U.S. PATENT DOCUMENTS

| 3,165,025 | 1/1965 | Hart | 362/11 |
| 3,853,409 | 12/1974 | Gaillochet | 356/432 |
| 3,958,509 | 5/1976 | Murray et al. | 101/426 |

FOREIGN PATENT DOCUMENTS

| 0051605 | 5/1981 | Japan | 356/379 |
| 0103605 | 6/1983 | Japan | 356/379 |
| 1019540 | 2/1966 | United Kingdom | 356/379 |

Primary Examiner—R. A. Rosenberger
Assistant Examiner—Crystal D. Cooper
Attorney, Agent, or Firm—Blakely Sokoloff Taylor & Zafman

[57] ABSTRACT

An apparatus for detecting an image area of a thin plate is provided having a housing having a vertical side plate at one side thereof, the vertical side plate having an opening; a door movable to close/open the opening; a holder for holding the thin plate in a location which covers the opening when the door is closed; a camera mounted inside the housing so as to oppose the vertical side plate; the florescent lamps mounted on the inner surfaces of upper and lower plates and side plates of the housing which are perpendicular to the vertical side plate so that illumination directions of the florescent lamps are directed toward the thin plate.

4 Claims, 5 Drawing Figures

APPARATUS FOR DETECTING IMAGE AREA OF THIN PLATE

BACKGROUND OF THE INVENTION

The present invention relates to an apparatus for detecting an image area of a thin plate, wherein a surface of the thin plate is photographed by photographic means, and picture areas of respective zones of the plate are detected to control an amount of ink to be applied thereto FIG. 1 is a side view showing the schematic configuration of a conventional offset printing press. Ink and damping water are supplied from an inking unit 3 and a damping unit 4 to the surface of a plate 2 wound around a plate cylinder 1, so that an image is formed on the image portion of the plate 2. The image is transferred to a blanket cylinder 5 brought into light contact with the plate cylinder 1. The image is then transferred to a sheet 8 passing through the blanket cylinder 5 and an impression cylinder 7. In this case, ink flowing out from an ink duct 9 is transferred through nips which have different phases and which are formed between the rollers such as distributing rollers 10 and vibrating rollers 11 which have different diameters. Therefore, the ink can be uniformly distributed onto the surface of the plate 2 along the circumferential direction thereof. The ink consumed in the image portion of the plate 2 can be sequentially replenished along an ink path. When the amount of ink supplied to the plate 2 is smaller than a predetermined amount, the printing density becomes excessively low. However, when the amount of ink becomes larger than the predetermined amount, the printing density becomes excessively high, resulting in degradation of the printing quality. In addition, when the ink is kept unused in the inking rollers, the glossy effect of the printed surface is lost. Proper control of the amount of ink is one of the most important factors in printing.

For this purpose, a conventional automatic ink adjusting apparatus has been proposed, wherein the ink duct 9 is divided into 30 to 50 zones along the width of the sheet 8, and ink duct keys 12 are provided for the respective zones, and wherein a compact motor 13 with a potentiometer is driven in response to an instruction from a control unit to adjust a proper amount of ink for each zone. However, the distribution of the image areas of the respective zones varies in accordance with the type of printed matter. When ink adjustment for the respective zones is performed after printing is started, a great amount of spoilage is generated during the adjustment period. Such adjustment becomes a time-consuming operation. Therefore, it is preferred that the picture areas of the respective zones of the printing plate are calculated before printing is started, and that coarse adjustment of the ink duct 9 by the keys 12 is then performed or an amount of ink is determined in accordance with a print sheet number prior to printing.

Various types of conventional picture area measuring apparatus for plates have been proposed. According to a typical measuring apparatus, a plate 2 is mounted on a plate cylinder 1 or another high-speed cylinder, and the cylinder is rotated. A detector is slid along the axial direction of the cylinder, and detected values are accumulated in units of zones. However, when the plate 2 is mounted on the plate cylinder 1, a space for scanning the plate along the axial direction is required, thus degrading the operability of the normal printing operation. In addition, as the detector is used on the printing press subjected to great vibrations, high precision cannot be guaranteed. In another conventional measuring apparatus using a high-speed rotary cylinder only for measurement, as the plate 2 must be mounted on the rotary cylinder in the same manner as in the case wherein the plate 2 is mounted on the plate cylinder 1, the operation becomes cumbersome. When a thin aluminum plate for an offset printing press is used, the mounting holes may be deformed, thus degrading the printing precision.

Another conventional measuring apparatus is also known. According to this apparatus, a plate 2 is horizontally placed on a table. A detector having a slit for covering the zone direction is slid along the plate surface. The detected values are accumulated in units of zones. In this apparatus, a detector scanning mechanism is complicated, and so the manufacturing cost is high. An elongated slit-like detector cannot be obtained. Instead, a plurality of photoelectric elements must be linearly aligned. In this sensor, it is difficult to achieve uniform element characteristics. As a result, high detection precision cannot be obtained.

Another conventional measuring apparatus using a surface light-emitting element and a surface detecting element is known. In this apparatus, an original film is clamped between a surface light-emitting element and a surface detecting element to measure the amount of light transmitted through the film. When a plurality of identical images are aligned within a single plate, the measured results are obtained in units of zones in accordance with the layout of the image, resulting in high cost and a cumbersome operation. In addition, it is very difficult to prepare a large-size printing press of suitable precision for commercial use.

Still another conventional measuring apparatus is proposed wherein image signal components are accumulated in units of zones when the image signal is transmitted as a facsimile signal. This apparatus is an expensive system using a complicated program and is used only in the newspaper industry or the like, and cannot therefore be regarded as a widespread standard apparatus.

In an attempt to solve all the conventional problems, still another conventional apparatus is provided, wherein a plate is placed on a horizontal table and is photographed by a photographic means while the plate is illuminated with sunlight or by an illuminating unit, and the resultant image signal is converted to an electrical signal to obtain correction values of the ink duct keys 12. However, in this case, when the plate is exposed to light from a lateral direction while the plate horizontally placed on the table is exposed under the illumination light so as to perform image area detection, the following problem occurs.

When the plate 2 is placed on the horizontal table and is illuminated from above, the plate is greatly influenced by external light, thereby degrading the measuring precision. In addition to this disadvantage, when the plate is illuminated from the side at which the plate 2 is mounted, the working space of the operator interferes with the illumination unit, and thus a sufficient intensity of light cannot be obtained and the mounting efficiency of the plate is degraded. However, in order to prevent this interference, when the plate 2 is illuminated from only the direction perpendicular to the mounting direction of the plate 2, the light efficiency is degraded since the distance from the center of the plate 2 is increased. As a result, irregular illumination occurs, thus disabling maintenance of high measuring precision.

SUMMARY OF THE INVENTION

It is an object of the present invention to provide an apparatus for detecting an image area of a thin plate, wherein a sufficient amount of light can be uniformly provided to a plate without the influence of external light, and high operation efficiency can be provided.

In order to achieve the above object of the present invention, there is provided an apparatus for detecting an image area of a thin plate, comprising:

a housing having a vertical side plate at one side thereof, the vertical side plate having an opening;

a door movable to close/open the opening;

a holder for holding the thin plate to be mounted to close the opening when the door is closed;

photographic means mounted inside the housing so as to oppose the vertical side plate; and illumination means mounted at least on inner surfaces of upper and lower plates and side plates of the housing which are perpendicular to the vertical side plate in such a manner that illumination directions of the illumination means are directed toward the thin plate.

BRIEF DESCRIPTION OF THE DRAWINGS

FIGS. 2 to 5 show an apparatus for detecting an image area of a thin plate according to an embodiment of the present invention, in which FIG. 2 is a longitudinal sectional view thereof, FIG. 3 is a plan view thereof, FIG. 4 is a cross-sectional view thereof, and FIG. 5 is a plan view of a plate.

DETAILED DESCRIPTION OF THE PREFERRED EMBODIMENT

The present invention will be described in detail with reference to a preferred embodiment.

Figure 1:
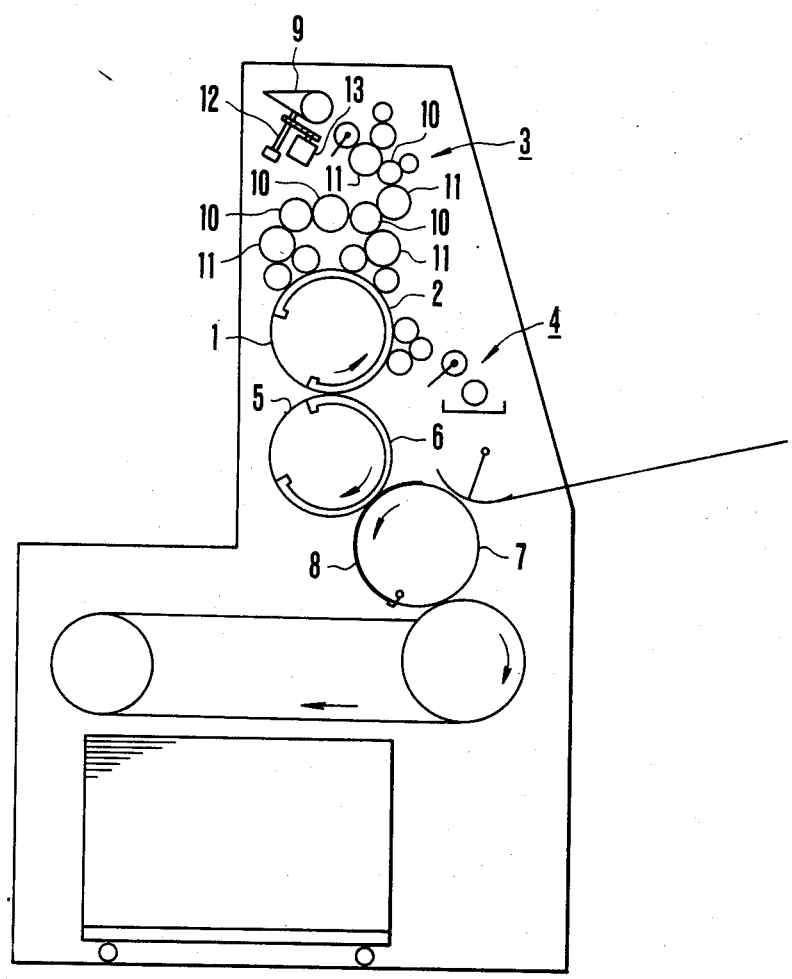
FIG. 1 is a side view showing a schematic configuration of a conventional offset printing press.
Figure 2:
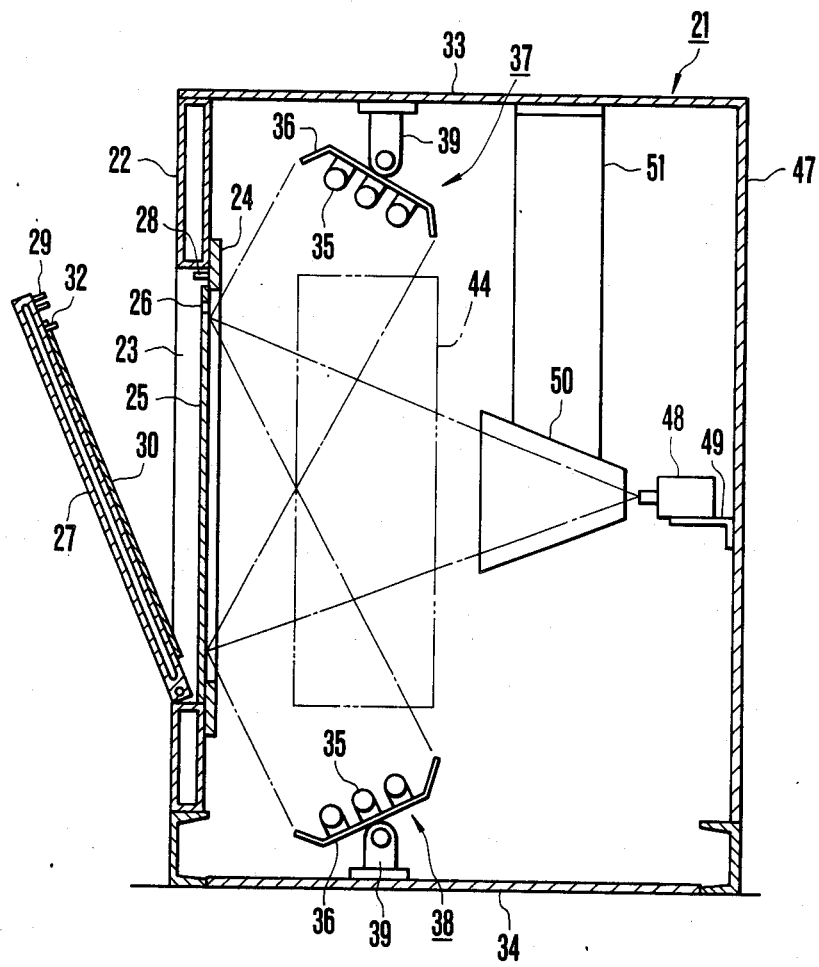
Figure 3:
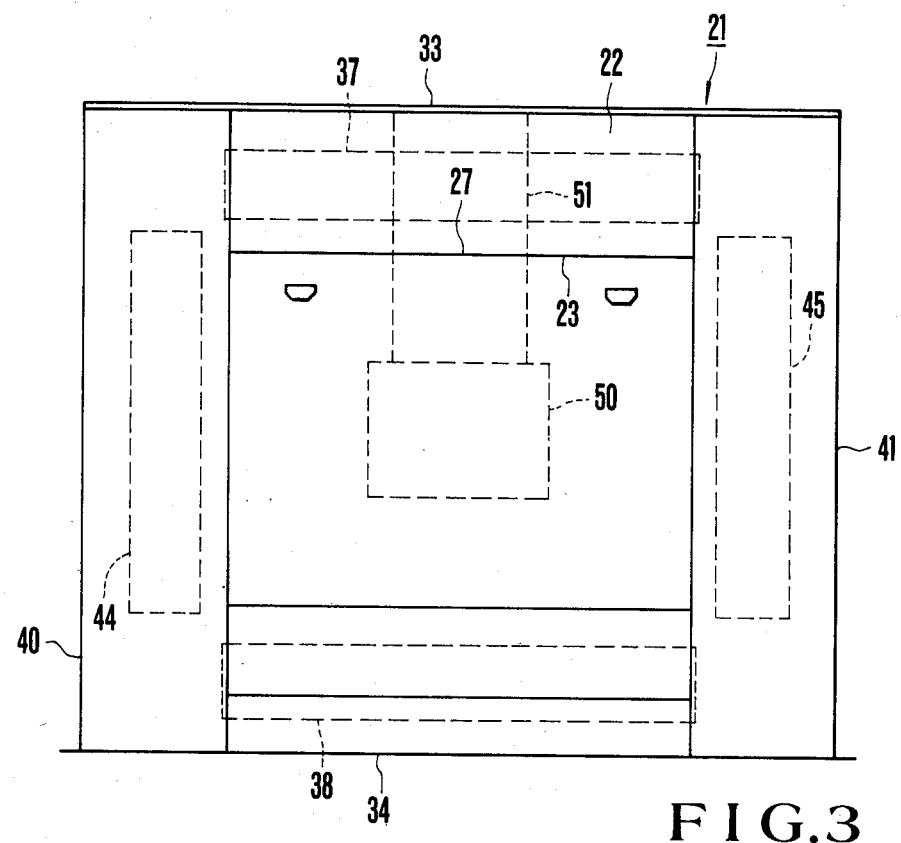
Figure 5:
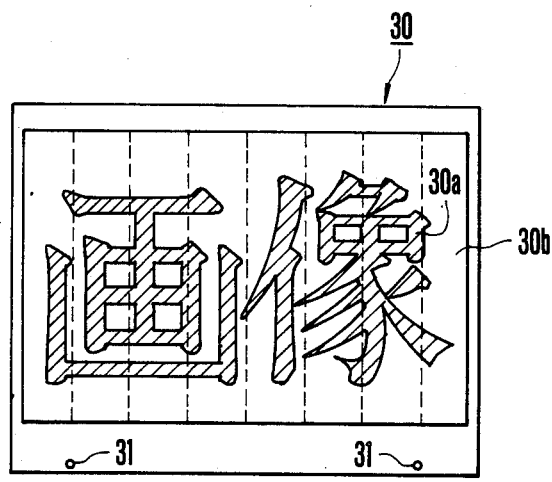
Figure 4:
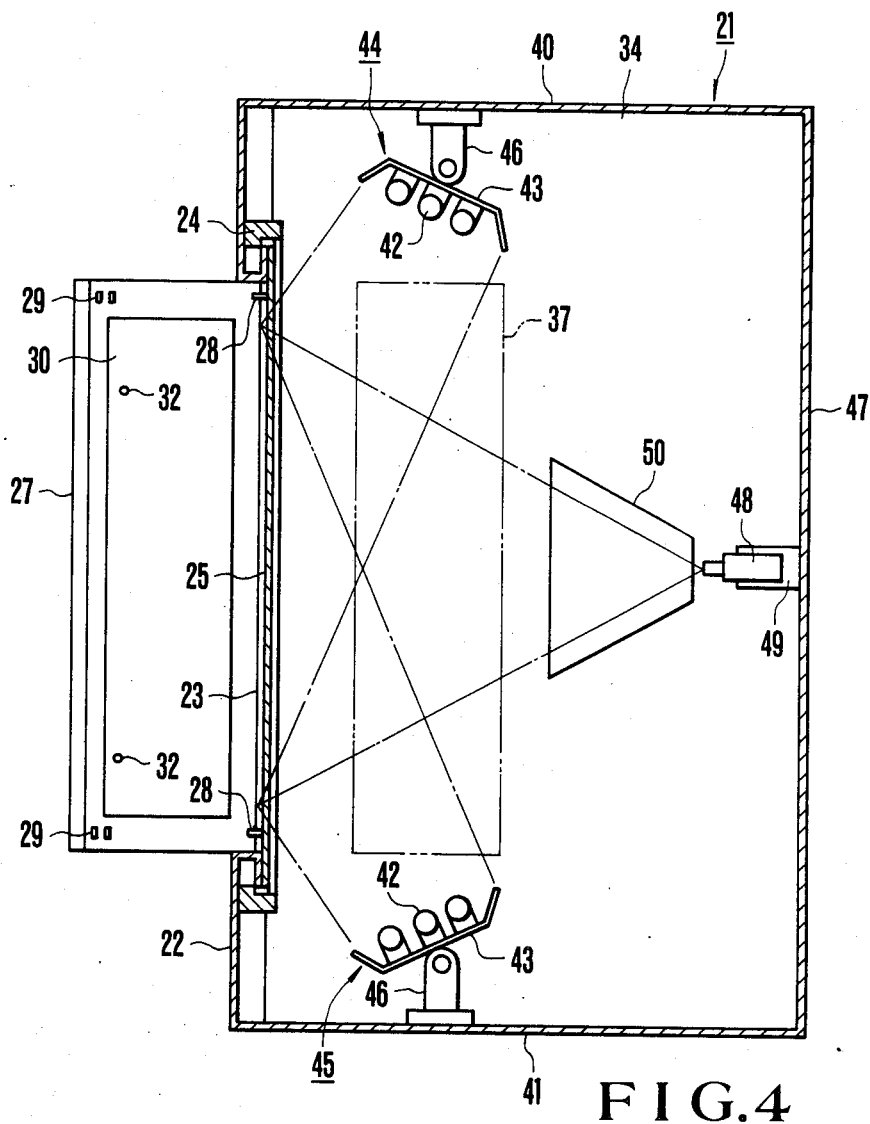

FIGS. 2 to 4 show an apparatus for detecting an image area of a thin plate according to an embodiment of the present invention, in which FIG. 2 is a longitudinal view thereof, FIG. 3 is a plan view thereof and FIG. 4 is a cross-sectional view thereof. A housing 21 having a front side corresponding to the upper surface of FIG. 3 has six rectangular side, upper and lower plates which constitute a rectangular prism. The height of this rectangular prism is smaller than the width thereof and is larger than the depth thereof. A vertical side plate 22 at the front side has a double structure. A rectangular opening 23 is formed at the center of the side plate 22. The long side of the rectangular opening 23 extends along the horizontal direction. A frame-like stopper 24 having a smaller size than the opening 23 is attached at the central portion of the inner surface of the side plate 22. A transparent glass plate 25 overlap the stopper 24. A pair of right and left holes 26 are formed at the upper end portion of the glass plate 25 and can receive corresponding pins. Reference numeral 27 denotes a door to be freely opened/closed with respect to the opening 23. The door 27 has a double structure. The lower end of the door 27 is pivotally supported at the lower edge defining the opening 23. The pivot angle of the door 27 is adjusted by abuting the lower end of the door 27 against the lower edge defining the opening 23. A ball-catch type locking means is provided at the upper end portions of the stopper 24 and the door 27. This locking means comprises a projection 28 for engaging with a holder 29 to lock the door 27 when the door is closed. Reference numeral 30 denotes an aluminum plate whose surface is illustrated in FIG. 5. A pair of right and left holes 31 are formed along one of the long sides of the aluminum plate 30. These holes 31 serve as an aligning reference and can be engaged with corresponding pins on the plate cylinder 1 when the plate 30 is mounted on the plate cylinder 1. A pair of reference pins 32 extend on the upper portion of the inner surface of the door 27 and can respectively engage with the holes 31. When the pins 32 are fitted in the holes 31 to suspend the plate 30 inside the door 27, and the door 27 is closed, the plate 30 is clamped between the inner surface of the door 27 and the outer surface of the glass plate 25.

An illumination unit and a photographic means are arranged inside the housing 21. The illumination unit illuminates the surface of the plate 30 when the plate 30 is mounted and the door 27 is closed. The photographic means photographs the illuminated plate 30. Illumination units 37 and 38 are supported by upper and lower plates 33 and 34 through corresponding brackets 39 at a depth slightly less than the center. Each of the illumination units 37 and 38 comprises three fluorescent lamps 35 having substantially the same length as the length of the opening 23, and a shade 36. The positions and inclined angle of the fluorescent lamps 35 of the illumination units 37 and 38 are determined such that the central fluorescent lamp 35 thereof emits light to the center along the vertical direction of the plate 39, and that an incident angle of the light from the central fluorescent lamp 35 with respect to the surface of the plate 30 is substantially 30°. Similarly, illumination units 44 and 45 are supported at side plates 40 and 41 through corresponding brackets 46 at a depth slightly less than the center of the plates 40 and 41. Each of the illumination units 44 and 45 comprises three fluorescent lamps 42 having substantially the same length as the length of the opening 23, and a shade 43. The positions and inclined angle of the fluorescent lamps 42 of the illumination units 44 and 45 are determined such that the central fluorescent lamp 42 thereof emits light to the center along the vertical direction of the plate 47, and that the incident angle of the light from the central fluorescent lamp 42 with respect to the surface of the plate 30 is substantially 30°. A camera 48 made of a solid-state image pickup device as photographic means is fixed on a bracket 49 in such a manner that the center of the lens is directed toward the center of the plate 30. The camera 48 photographs the plate 30 illuminated by the illumination units 37, 38, 44 and 45. A quadrangular pyramid-like lens hood 50 is supported by a support plate 51 suspended from the upper plate 33 and prevents the lateral light component from entering the camera 48. The camera 48 is connected to the compact motor 13 with the potentiometer through an operation unit (not shown) and a control unit (not shown). Ports (not shown) to allow personnel to enter the housing 21 are formed for replacement of fluorescent lamps and other maintenance operations.

The operation of apparatus having the above arrangement will now be described. The plate 30 to be mounted on the outer surface of the plate cylinder 1 comprises a thin aluminum rectangular plate shown in FIG. 5. The plate 30 has an ink-receptive image portion 30a at the time of printing and an ink-repellent nonimage portion 30b. 30 to 50 zones are set along the width of the ink duct 9, and an ink duct key 12 is arranged for each zone.

For illustrative convenience, the plate 30 is divided into eight zones in FIG. 5. Ratios of image portions 30a to corresponding nonimage portions 30b differ in units of zones. The door 27 of the housing 21 in the apparatus is opened to suspend the plate 30 and is then closed. The plate 30 is clamped between the door 27 and the glass plate 25. The door 27 is fixed by fitting the projection 28 into the holder 29. When the fluorescent lamps 35 and 42 are turned on, light from the fluorescent lamps 35 and 42 is transmitted through the glass plate 25 and illuminates the surface of the plate 30. Light reflected by the plate surface is photographed by the camera 48. The photographed image data is processed by an operation unit connected to the camera 48. The processed data is supplied to the compact motor 13 with the potentiometer so as to adjust openings of the ink duct keys 12 of the respective zones.

In the above embodiment, the illumination units 37, 38, 44 and 45 are arranged at the upper, lower, right and left positions inside the housing 21. However, only the upper and lower illumination units 37 and 38 having a short illumination distance need be arranged. The plate 30 need not be mounted on the door 27. The plate 30 may be suspended from the reference pins 32 on the side of the opening 23 in the vertical side plate 22. In this case, when the door 27 is closed, the plate 30 is clamped between the door 27 and the glass plate 25. The arrangement of the door 27 is not limited to the type described in the above embodiment, but may comprise a sliding door along the side plate 22. When the plate 30 is not mounted on the door 27, two doors may be arranged to be separated from each other on opening.

As is apparent from the above description, in the apparatus for detecting the picture area of the thin plate, an opening is formed in the vertical side plate of the housing and can be closed/opened by a door. Illumination units are arranged at least at upper and lower inner surfaces of the upper, lower, right and left inner surfaces perpendicular to the vertical side plate. A photographic means is mounted on the side plate opposing the vertical side plate to pick up the image of the plate and to generate a signal. External light can be completely excluded, and the camera will not be undesirably influenced thereby. As a result, the illumination light is uniformly distributed to the entire surface of the plate. Therefore, the detection precision can be greatly improved. In addition to this advantage, the plate mounting space is separated from the illumination and photographing sections and so will not interfere therewith. The optimal illumination direction and angle can be selected to obtain a sufficient amount of illumination, thereby improving the detection precision. In order to obtain high illumination efficiency, the plate need not be vertically aligned, but may be horizontally aligned. Therefore, the plate can be easily and accurately mounted to improve the operability and detection precision.

What is claimed is:

1. An apparatus for detecting an image area of a thin plate comprising:
   a housing having a vertical side plate at one side thereof, said vertical side plate having an opening;
   a door movable to close/open said opening;
   a holder for removably mounting the thin plate such that when said door is closed said plate covers at least a portion of said opening;
   photographic means mounted inside said housing so as to oppose said vertical side plate; and
   illumination means mounted on inner surfaces of upper and lower plates and side plates of said housing, each of said illumination means having three fluorescent lamps and being perpendicular to said vertical side plate in such a manner that illumination directions of said illumination means are directed toward said thin plate.

2. An apparatus according to claim 1, wherein said illuminating means comprises at least upper and lower illumination units each of which has a shade and is mounted on a corresponding inner surface via a corresponding bracket, positions and inclined angle of said fluorescent lamps of the upper and lower illumination units being determined such that a central fluorescent lamp thereof emits light to the center along the vertical direction of the thin plate, and that an incident angle of the light from said central fluorescent lamps with respect to the surface of the thin plate is substantially 30°.

3. An apparatus according to claim 1, wherein said holder comprises a transparent glass plate and pins for engaging with holes formed in the thin plate.

4. An apparatus according to claim 1, wherein said photographic means comprises a solid-state image pickup device.

* * * * *